Figure 1:
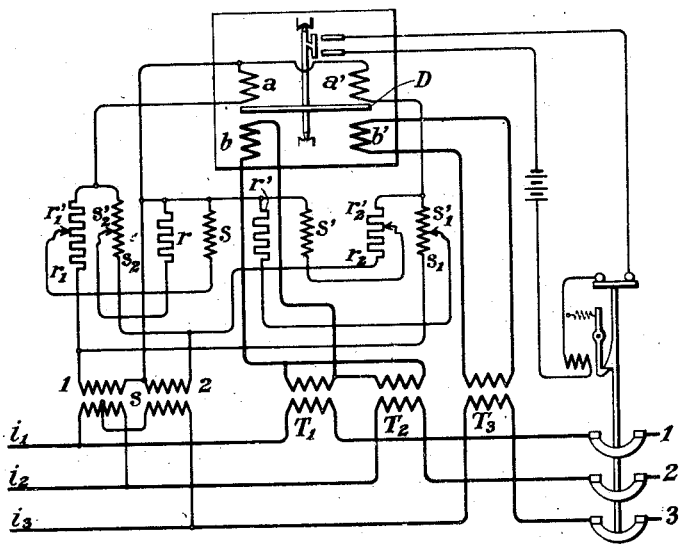

July 28, 1931.  E. GRASSOT  1,816,729
DEVICE RESPONSIVE TO UNBALANCE IN POLYPHASE
CIRCUIT VOLTAGES AND CURRENTS
Original Filed Aug. 13, 1926

Inventor:
Emile Grassot,
by Charles E. Mullan
His Attorney.

Patented July 28, 1931

1,816,729

UNITED STATES PATENT OFFICE

EMILE GRASSOT, OF MEUDON, FRANCE, ASSIGNOR TO GENERAL ELECTRIC COMPANY, A CORPORATION OF NEW YORK

DEVICE RESPONSIVE TO UNBALANCE IN POLYPHASE CIRCUIT VOLTAGES AND CURRENTS

Original application filed August 13, 1926, Serial No. 129,032, and in France December 23, 1925. Divided and this application filed October 25, 1930. Serial No. 491,232.

My invention relates to improvements in devices responsive to unbalance in polyphase circuit voltages and currents and more particularly relays, metering apparatus, etc., which operate in response to phase sequence components of the power of an electric circuit and an object of my invention is to provide improved and simple apparatus whereby to obtain operation in accordance with a given phase sequence component of the power of an alternating current circuit.

In measuring apparatus, relays and devices for line protection which take into account unbalanced voltages or currents, the equivalence between a system of any $q$-vectors which are concurrent and situated in one plane and $q$-systems each made up of $q$-symmetrical vectors (systems of balanced vectors) is employed. These vectors represent the components of an electric quantity, such as polyphase alternating voltages, currents, ampere turns, fluxes or magnetic fields, etc., according to the case in point.

In one of these systems, called the positive phase sequence system, two cyclically consecutive vectors form between each other an angle $\frac{2\pi}{q}$ in the positive direction. In another system, called the negative phase sequence system, two cyclically consecutive vectors form between each other an angle of $\frac{2\pi}{q}$ in a direction opposite to that of the preceding.

In order to obtain the positive or negative phase sequence components of the currents, voltages, powers, etc., or of the functions of these quantities, circuit arrangements are generally utilized. The system from which the symmetrical components are thus obtained has the same number of phases as the basic or fundamental system. Thus, for example in the case of a system of three-phase currents, the positive or negative phase sequence components of ampere turns forming part of a three-phase system, etc., can be obtained.

It may be desirable to obtain the positive and negative phase sequence components or functions thereof pertaining to a system with a number of phases differing from that of a given system. Thus, for protecting or measuring a three-phase system, the positive or negative phase sequence components or functions thereof in a two-phase system unbalanced to the same extent, $\epsilon = \frac{I}{D}$, as the three-phase system under consideration, D being the length of one of the vectors of the positive phase sequence system and I the length of a vector of the negative phase sequence system.

In this connection the given system of voltages or currents, taken as three-phase will be converted into a two-phase system of currents, voltages, ampere turns, fields or magnetic fluxes, etc., unbalanced to the same extent, that is the ratio of the positive and negative phase sequence components of each system is the same. Suitable circuit arrangements will then be applied to this latter equipment enabling its positive or negative phase sequence components or functions thereof to be obtained or circuit arrangements will be used starting from a three-phase system of voltages or currents enabling the positive or negative phase sequence components or functions thereof to be obtained directly from a two-phase system unbalanced to the same degree as the first.

My invention includes line protecting devices, relays, measuring apparatus and devices in which the unbalance of the circuits or lines, characterized by the application of the principles indicated above, that is, by the use of devices some of which are known to the art such as the Scott system, rotating field phase, transformers, etc., plays a part enabling the positive or negative phase sequence components or functions thereof of a system with a number of phases differing from that of the circuit to be protected or on which the measurements are taken, to be obtained.

The number of phases of the intermediary system will be chosen so as to simplify the construction of the apparatus or other circuit arrangements. Further, the passing from one system to another may be made outside or inside the apparatus or device.

My invention will be better understood from the following description when considered in connection with the accompanying drawings and its scope will be pointed out in the appended claims.

This application is a division of my application, Serial No. 129,032, filed August 13, 1926, for devices responsive to unbalanced currents or voltages.

Figure 2:
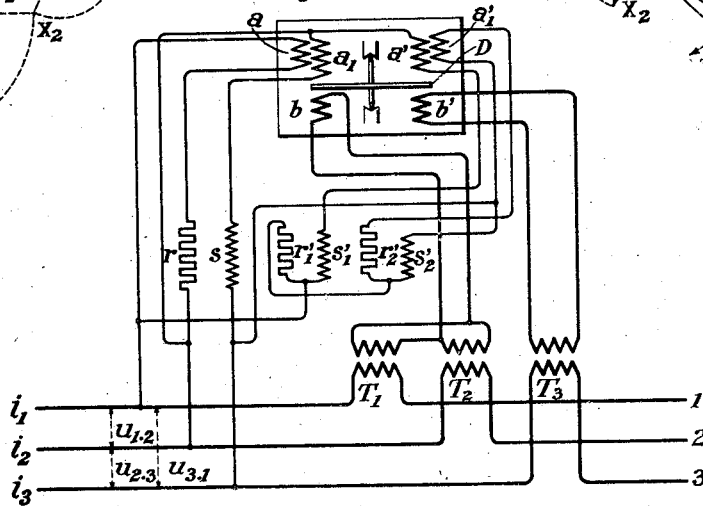

In the accompanying drawings Fig. 1 illustrates diagrammatically electroresponsive apparatus embodying my invention; Fig. 2 illustrates diagrammatically a modification of my invention and Figs. 3 and 4 are vector diagrams explanatory of my invention.

In the illustrated embodiments of my invention, it will be assumed that power measurements are to be made on a three-phase system or that a three-phase circuit is to be protected and that the three-phase system of voltages or currents may be transformed into a two-phase system of voltages, ampere-turns, fluxes, magnetic fields, etc., or that the positive or negative phase sequence components of these values or of the active, reactive or complex power in the latter system are obtained. This transformation enables the essential properties of two-phase systems to be utilized, that is to have only two vectors which in balanced systems are 90° out of phase with each other.

Figure 3:
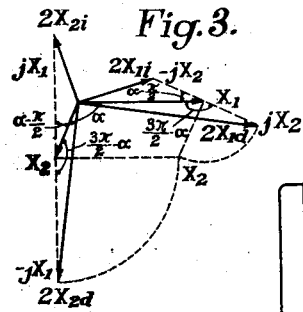
Figure 4:
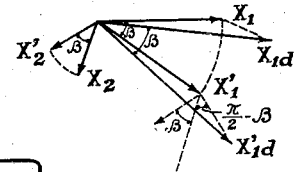

In Fig. 3, let $X_1$ and $X_2$ be the two vectors of a two-phase system. The positive phase sequence component of the vector $X_1$ will be $$2X_{1_d} = X_1 + jX_2$$

where $j = \sqrt{-1}$, and the negative phase sequence component will be $$2X_{1_i} = X_1 - jX_2.$$

For vector $X_2$ the positive phase sequence component will be $$2X_{2_d} = X_2 - jX_1 = -j(X_1 + jX_2) = -2jX_{1_d}.$$

Similarly the negative phase sequence component will be $$2X_{2_i} = X_2 + jX_1 = j(X_1 - jX_2) = 2jX_{1_i}.$$

From these formulæ, twice the postive phase sequence components $2X_{1_d}$ and $2X_{2_d}$ are obtained by adding to $X_1$ a vector $jX_2$ equal to $X_2$ and leading $\frac{\pi}{2}$ in order to obtain $2X_{1_d}$, and by adding to $X_2$ a vector $-jX_2$ equal to $X_2$ and lagging $\frac{\pi}{2}$ in order to obtain $2X_{1_i}$. In order to obtain the negative phase sequence components, vectors are added to $X_1$ and $X_2$ respectively equal to and directly opposite to those used for the positive phase sequence components.

In certain cases, it may not be convenient to obtain the values represented by the vectors $jX_1$, $jX_2$ or $-jX_1$, $-jX_2$. However, it will be observed from Fig. 3 that the positive and negative phase sequence components of $X_1$ are obtained by adding geometrically to a vector equal to $X_1$ a vector of length $X_2$ making with it an angle $\left(\frac{3\pi}{2}-\alpha\right)$ and $\left(\alpha-\frac{\pi}{2}\right)$ respectively in a suitable direction. Similarly, in order to obtain the positive and negative phase sequence components of $X_2$, a vector of length $X_1$ is added geometrically to $X_2$, making with $X_2$ angles of $\left(\frac{3\pi}{2}-\alpha\right)$ and $\left(\alpha-\frac{\pi}{2}\right)$ respectively in a suitable direction.

Often the length of $X_{1_d}$ or $X_{2_d}$ only is required or of $X_{1_i}$ or $X_{2_i}$. In this case, to obtain for example the positive phase sequence component, a vector $X'_1$ may be taken instead of $X_1$ of length $kX_1$ equal to or proportional to the length of $X_1$ and out of phase with respect to it by an angle $\beta$ lagging for example as shown in Fig. 4. If a vector $X'_2$ is added to it of length $kX_2$ equal or proportional to $X_2$ with the same coefficient of proportion, but leading by $\frac{\pi}{2}$ with respect to $X'_2$, hence by $\left(\frac{\pi}{2}-\beta\right)$ with respect to $X_2$, the resultant of the two vectors thus obtained will give a vector $X'_{1_d}$ of length $kX_{1_d}$ equal or proportional to $X_{1_d}$ and lagging it by angle $\beta$. Similar remarks can be made concerning the other components of $X_1$ and $X_2$.

From the foregoing, it follows that values can be obtained equal or proportional to the positive or negative phase sequence components of the given out-of-phase values by producing suitable phase displacements, leading or lagging, of angles differing from $\frac{\pi}{2}$ by means of resistances, reactances, self or mutual inductances, capacities, transformers, short-circuited windings, etc.

For operation in response to a given phase sequence component of power, one of the systems of values, for example the voltages, can be transformed into two-phase and the other, for example the currents, left in three-phase form, or the voltages and currents can be transformed from three-phase to two-phase and the two negative (or positive) phase sequence components of the voltages can be acted upon by the two-phase currents themselves or vice-versa. It can be shown that, in these cases, torques are obtained depending on only the positive or negative phase sequence component of the power, that is a symmetrical phase sequence component of the power.

Fig. 1 shows the wiring diagram of an induction disk type of relay or wattmeter measuring the negative (or positive) phase sequence components of power; $a$ and $a'$ are two voltage windings; $b$, $b'$ the current windings on the corresponding electromagnets; D a disk; S a Scott transformer; $T_1$, $T_2$, $T_3$ three current transformers which feed $b'$ with current proportional to the current $i_3$ of phase 3 and the coil $b$ with current proportional to $(i_1-i_2)$ the difference between the currents $i_1$ and $i_2$ of phases 1 and 2; and $r$, $r'$, $r_1$, $r'_1$, $r_2$, $r'_2$, $s_1$, $s'_1$, $s_2$, $s'_2$, $s$, $s'$ are resistances and reactances which produce the necessary phase displacements in order to obtain the negative (or positive) phase sequence components of two-phase voltages given by the secondaries 1 and 2 of the Scott system.

In this case there is combined with a system of three-phase currents changed to a system of two-phase currents unbalanced to the same degree, a system of three-phase voltages changed to a system of two-phase voltages whose desired phase sequence component is segregated by means of the circuit arrangement embodying the resistances $r$ and reactances $s$. Inasmuch as the currents in the windings $a$, $a'$ are proportional to the negative (or positive) phase sequence components of the voltages, the relay is influenced solely by the negative (or positive) phase sequence components of the power for only the fluxes due to the negative (or positive) phase sequence components of the currents in the windings $b$, $b'$ combine with the fluxes due to the voltages on the windings $a$, $a'$ to produce a torque on the disk D.

Fig. 2 is a wiring diagram for a wattmeter or wattmetric relay for measuring the negative phase sequence component of power in which two negative phase sequence components of ampere-turns are obtained 90° out of phase with each other, that is to say the two negative phase sequence components of a two-phase system of values proportional to the negative phase sequence components of the given three-phase voltage system, without transforming the three-phase voltage system into a two-phase system unbalanced to the same degree.

In this figure 1, 2, 3 represent the three line wires of a three-phase circuit through which the currents $i_1$, $i_2$, $i_3$ flow; $a$, $a_1$ a double voltage winding of an electromagnet, of which $b$ is the current coil $a'$, $a'_1$, $b'$ are the respective windings of a second electromagnet; $r$, $r'_1$, $r'_2$ are resistances; $s$, $s'_1$, $s'_2$ are reactances, allowing resultant ampere-turns to be produced in $a$, $a_1$ proportional to the negative phase sequence component of the voltage $u_{1\cdot 2}$ and in $a'$, $a'_1$ a component equal to the preceding one and $\frac{\pi}{2}$ out of phase with respect to it. In practice the current in $a$ can be in phase with $u_{1\cdot 2}$, that in $a_1$ 60° lagging on $u_{1\cdot 2}$; the current in $a'$ will lag $u_{2\cdot 1}$ 30° and that in $a'_1$ will lead $u_{1\cdot 3}$ 30°. $T_1$, $T_2$, $T_3$ represent three current transformers enabling ampere-turns in quadrature to be obtained in the current coils $b$ and $b'$.

In this case there is combined with a system of three-phase currents changed to a system of two-phase currents unbalanced to the same degree a system of three-phase voltages whose negative phase sequence component is segregated by means of the circuit arrangement embodying the resistances $r$ and reactances $s$. It will be noted that with both of the illustrated embodiments of my invention it is necessary to segregate the phase sequence components of only one of the factors, current and voltage, which go to make up the power. For the sake of convenience, simplicity and accuracy it is better to use the segregating networks or circuits with the voltage and with the current, although my invention is not so limited but, in accordance with my invention, it is sufficient to segregate the phase sequence component of only one of the quantities, either the current or the voltage.

The desired phase displacements can be effected by windings short-circuited through variable resistances, said windings being associated with the voltage and current circuits and thereby affording means of acting on the phase displacements of the negative phase sequence components of the fluxes of the voltage circuits or on the fluxes of the current circuits. The currents could also be combined in a manner differing from that indicated in the figures, without departing from the scope of my invention.

While I have shown and described by invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination with a three-phase circuit, a relay having two current windings respectively connected to be energized in accordance with the current in one phase conductor and the difference between the currents in the remaining two phase conductors and voltage windings arranged to cooperate with said current windings and connected to be energized in accordance with the negative phase sequence components of the voltages of a two-phase system having effective values dependent on the components of the voltages of the three-phase circuit.

2. In combination with a three-phase circuit, a relay having two current windings respectively connected to be energized in accordance with the current in one phase conductor and the difference between the currents in the remaining two phase conductors and voltage windings arranged to cooperate with said current windings and connected to be energized in accordance with one of the symmetrical phase sequence components of the voltages of the circuit.

3. In combination with a three-phase electric circuit, a wattmetric device responsive to a symmetrical phase sequence component of the power of the circuit including cooperating current and voltage means, said current means being connected to said circuit to be energized in accordance with a two-phase system of currents unbalanced to the same extent as the currents of the three-phase circuit and means for energizing said voltage means in accordance with one of the symmetrical phase sequence components of a two-phase system of voltages unbalanced to the same extent as the voltages of the three-phase circuit.

4. In combination with a polyphase circircuit, a wattmetric device responsive to a symmetrical phase sequence component of the power of the circuit including cooperating current and voltage winding means, said current winding means being connected to be energized by more than one of the phase sequence components of the currents in the phase conductors of the circuit and means for energizing the voltage winding means in accordance with only one of the symmetrical phase sequence components of the voltages of the circuit.

5. In combination with a three-phase circuit, a wattmetric device responsive to a symmetrical phase sequence component of the power of the circuit including cooperating current and voltage means, said current means being connected to said circuit to be energized in accordance with a two-phase system of currents unbalanced to the same extent as the currents of the three-phase circuit and means for energizing said voltage means in accordance with one of the symmetrical phase sequence components of the voltages of the three-phase circuit.

6. In combination with a polyphase circuit, a wattmetric device responsive to a symmetrical phase sequence component of the power of the circuit including cooperating means for producing an effect dependent on the product of two quantities, the current and the voltage, of the circuit, one of said means being connected to be energized by more than one of the phase sequence components of the power of one of said quantities and means for energizing the other of said cooperating means only in accordance with a symmetrical phase sequence component of the other of said quantities.

7. In combination with a polyphase circuit, an induction disk device responsive to the negative phase sequence component of the power of the circuit including cooperating current and voltage winding means, said current winding means being connected to be energized by more than one of the phase sequence components of the current in the phase conductors of the circuit and means for energizing the voltage winding means in accordance with only the negative phase sequence component of the voltages of the circuit.

In witness whereof, I have hereunto set my hand this 11th day of October, 1930.

EMILE GRASSOT.

Certificate of Correction

Patent No. 1,816,729.  Granted July 28, 1931, to

EMILE GRASSOT

It is hereby certified that error appears in the printed specification of the above-numbered patent requiring correction as follows: Page 2, lines 45 to 47, strike out the formula and insert instead $$2X_{2_d} = X_2 - jX_1 = -j(X_1 + jX_2) = -2jX_{1_d};$$

page 3, line 105, for " by " read *my;* and that the said Letters Patent should be read with these corrections therein that the same may conform to the record of the case in the Patent Office.

Signed and sealed this 15th day of September, A. D. 1931.

[SEAL.]
M. J. MOORE,
*Acting Commissioner of Patents.*